(12) United States Patent
Lee et al.

(10) Patent No.: US 11,756,493 B2
(45) Date of Patent: Sep. 12, 2023

(54) STACKED DISPLAY DEVICE AND CONTROL METHOD THEREOF

(71) Applicant: Samsung Electronics Co., Ltd., Suwon-si (KR)

(72) Inventors: Jihye Lee, Suwon-si (KR); Bora Jin, Suwon-si (KR); Youngjin Yoon, Suwon-si (KR); Yeoul Lee, Suwon-si (KR); Jaesung Lee, Suwon-si (KR); Sunil Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/583,753

(22) Filed: Jan. 25, 2022

(65) Prior Publication Data

US 2022/0157265 A1    May 19, 2022

Related U.S. Application Data

(63) Continuation of application No. PCT/KR2021/013998, filed on Oct. 12, 2021.

(30) Foreign Application Priority Data

Nov. 18, 2020    (KR) .......................... 10-2020-0154798

(51) Int. Cl.
*G09G 3/34* (2006.01)
*G09G 3/20* (2006.01)

(52) U.S. Cl.
CPC ......... *G09G 3/3433* (2013.01); *G09G 3/2003* (2013.01); *G09G 2300/023* (2013.01); *G09G 2320/0686* (2013.01)

(58) Field of Classification Search
CPC ..... G09G 2320/0686; G09G 2300/023; G09G 3/2003; G09G 3/3433
See application file for complete search history.

(56) References Cited

U.S. PATENT DOCUMENTS 7,956,821 B2    6/2011    Ikeno et al.
8,009,249 B2    8/2011    Yoshihara et al.
(Continued)

FOREIGN PATENT DOCUMENTS

JP    2013-156658 A    8/2013
KR    10-0903532 B1    6/2009
(Continued)

OTHER PUBLICATIONS

International Search Report and Written Opinion dated Jan. 27, 2022, issued in International Patent Application No. PCT/KR2021/013998.

(Continued)

*Primary Examiner* — Towfiq Elahi
(74) *Attorney, Agent, or Firm* — Jefferson IP Law, LLP

(57) ABSTRACT

A stacked display device and a control method thereof are provided. The stacked display device includes a stacked display including a first panel and a second panel comprising a different transmittance from the first panel and a processor to obtain a first layer image to display an image on the first panel and a second layer image to display an image on the second panel, adjust brightness of the second layer image based on a ratio between a first transmittance for the first panel and a second transmittance for the second panel, and a pixel value of the second layer image, and control the stacked display to display the second layer image of which brightness is adjusted on the second panel while displaying the first layer image on the first panel.

13 Claims, 14 Drawing Sheets

(56) References Cited

U.S. PATENT DOCUMENTS

| | | |
|---|---|---|
| 8,319,701 B2 | 11/2012 | Ikeno et al. |
| 8,848,006 B2 | 9/2014 | Wetzstein et al. |
| 9,087,470 B2 | 7/2015 | Hur et al. |
| 10,115,356 B2 | 10/2018 | Endo et al. |
| 10,527,876 B2 | 1/2020 | Yokonuma |
| 10,802,263 B2 | 10/2020 | Vaziri et al. |
| 11,199,691 B2 | 12/2021 | Vaziri et al. |
| 2006/0158455 A1 | 7/2006 | Yoshino |
| 2008/0068314 A1* | 3/2008 | Hsieh .................. G09G 3/2011 349/56 |
| 2008/0088649 A1 | 4/2008 | Ikeno et al. |
| 2010/0118006 A1* | 5/2010 | Kimura ............... G09G 3/3611 348/673 |
| 2012/0092385 A1 | 4/2012 | Ikeno et al. |
| 2012/0154463 A1 | 6/2012 | Hur et al. |
| 2019/0122373 A1 | 4/2019 | Natroshvili et al. |
| 2019/0166359 A1* | 5/2019 | Lapstun ............... H04N 13/307 |
| 2020/0154096 A1 | 5/2020 | Kim |
| 2020/0201018 A1 | 6/2020 | Vaziri et al. |
| 2021/0033843 A1 | 2/2021 | Vaziri et al. |

FOREIGN PATENT DOCUMENTS

| | | |
|---|---|---|
| KR | 10-2011-0097390 A | 8/2011 |
| KR | 10-2012-0069432 A | 6/2012 |
| KR | 10-1868405 B1 | 6/2018 |
| KR | 10-2020-0027468 A | 3/2020 |

OTHER PUBLICATIONS

Keita Takahashi et al., "From Focal Stack to Tensor Light-Field Display," IEEE Transactions on Image Processing, vol. 27, No. 9, pp. 4571-4584, Sep. 2018.

\* cited by examiner

FIG. 5B
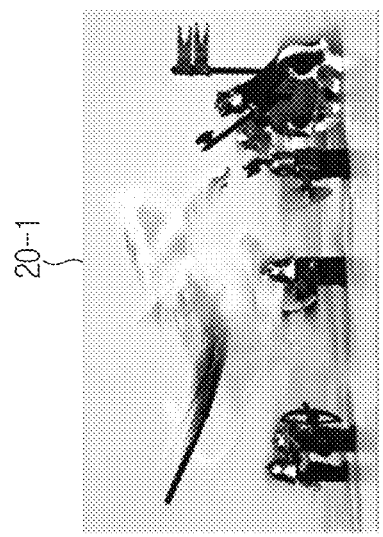
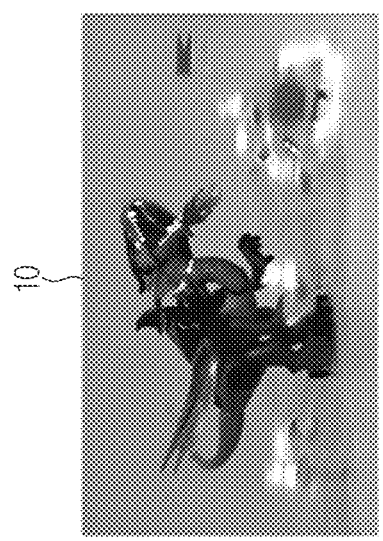
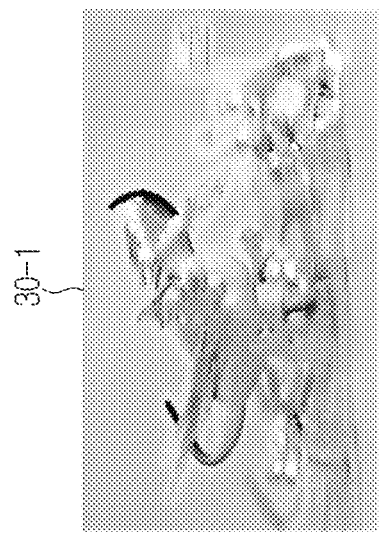

STACKED DISPLAY DEVICE AND CONTROL METHOD THEREOF

CROSS-REFERENCE TO RELATED APPLICATION(S)

This application is a continuation application, claiming priority under § 365(c), of an International application No. PCT/KR2021/013998, filed on Oct. 12, 2021, which is based on and claims the benefit of a Korean patent application number 10-2020-0154798, filed on Nov. 18, 2020, in the Korean Intellectual Property Office, the disclosures of which is incorporated by reference herein in their entirety.

BACKGROUND

1. Field

The disclosure relates to a stacked display device and a control method thereof. More particularly, the disclosure relates to a stacked display device capable of alleviating a color distortion phenomenon and a control method thereof.

2. Description of Related Art

In the related art, a method for displaying an image using a stacked display device is proposed to express a stereoscopic effect of an image. The stacked display device may be implemented by stacking two or more display panels, and an image may be displayed on each of the two or more display panels to provide an image in which a three-dimensional depth is reflected.

However, in the case of a related-art stacked display device stacking color panels including a color filter, brightness may be degraded due to a plurality of color filters.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a stacked display device composed of a color panel including a color filter and a monochrome panel not including a color filter.

Additional aspects will be set forth in part in the description which follows and, in part, will be apparent from the description, or may be learned by practice of the presented embodiments.

In accordance with an aspect of the disclosure, a stacked display device is provided. The stacked display device includes a stacked display comprising a first panel and a second panel having a different transmittance from the first panel and a processor to obtain a first layer image to display an image on the first panel and a second layer image to display an image on the second panel, adjust brightness of the second layer image based on a ratio between a first transmittance for the first panel and a second transmittance for the second panel, and a pixel value of the second layer image, and control the stacked display to display the second layer image of which brightness is adjusted on the second panel while displaying the first layer image on the first panel.

The first panel may be a color panel including a color filter, and the second panel may be a monochrome panel not including a color filter.

The stacked display may further include a third panel, and the processor may obtain a third layer image to display an image on the third panel, obtain a third transmittance for the third panel, obtain a third layer image of which brightness of the third layer image is adjusted based on the ratio between the first transmittance and the third transmittance and the pixel value of the third layer image, and control the stacked display to display the third layer image of which the brightness is adjusted on the third panel.

The third panel may further include a multi-array lens.

The pixel value of the second layer image may be an average value of a plurality of pixel values included in the second layer image.

The processor may obtain a second layer image of which brightness by objects of the second layer image is adjusted based on a representative pixel value of each of the objects included in the second layer image.

The processor may, based on the first layer image and the second layer image being a video, obtain a second layer image of which brightness of the second layer image is adjusted based on an average pixel value of the entire video frame.

The processor may, based on the first layer image and the second layer image being a video, obtain a second layer image of which brightness of the second layer image is adjusted based on an average pixel value of the video frames.

The processor may obtain the first layer image and the second layer image by inputting a plurality of light field (LF) images of different views to a factorization model for converting the LF image to a layer image.

The processor may obtain a restored LF image by inputting the first layer image and the second layer image to a simulation model, obtain a loss function by comparing the LF image and the restored LF image, and train the factorization model based on the loss function.

In accordance with another aspect of the disclosure, a control method of a stacked display device is provided. The control method includes obtaining a first layer image to display an image on the first panel and a second layer image to display an image on the second panel, adjusting brightness of the second layer image based on a ratio between a first transmittance for the first panel and a second transmittance for the second panel, and a pixel value of the second layer image, and displaying the second layer image of which brightness is adjusted on the second panel while displaying the first layer image on the first panel, wherein a transmittance of the first panel is different from the transmittance of the second panel.

The first panel may be a color panel including a color filter, and the second panel may be a monochrome panel not including a color filter.

The stacked display may further include a third panel, and the control method may further include obtaining a third layer image to display an image on the third panel, obtaining a third transmittance for the third panel, obtaining a third layer image of which brightness of the third layer image is adjusted based on the ratio between the first transmittance and the third transmittance and the pixel value of the third layer image, and displaying the third layer image of which the brightness is adjusted on the third panel.

The third panel may further include a multi-array lens.

The pixel value of the second layer image may be an average value of a plurality of pixel values included in the second layer image.

The obtaining the adjusted second layer image may include obtaining a second layer image of which brightness by objects of the second layer image is adjusted based on a representative pixel value of each of the objects included in the second layer image.

The obtaining the adjusted second layer image may include, based on the first layer image and the second layer image being a video, obtaining a second layer image of which brightness of the second layer image is adjusted based on an average pixel value of the entire video frame.

The obtaining the adjusted second layer image may include, based on the first layer image and the second layer image being a video, obtaining a second layer image of which brightness of the second layer image is adjusted based on an average pixel value of the video frames.

The method may further include obtaining the first layer image and the second layer image by inputting a plurality of light field (LF) images of different views to a factorization model for converting the LF image to a layer image.

The method may further include obtaining a restored LF image by inputting the first layer image and the second layer image to a simulation model, obtaining a loss function by comparing the LF image and the restored LF image, and training the factorization model based on the loss function.

Advantageous Effects

Through the above embodiments, the stacked display device may alleviate a color distortion phenomenon that may occur due to a difference in transmittance between a monochrome panel and a color panel.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5B is a diagram illustrating a plurality of layer images of which brightness is adjusted according to an exponent value corresponding to each layer image according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Figure 1:
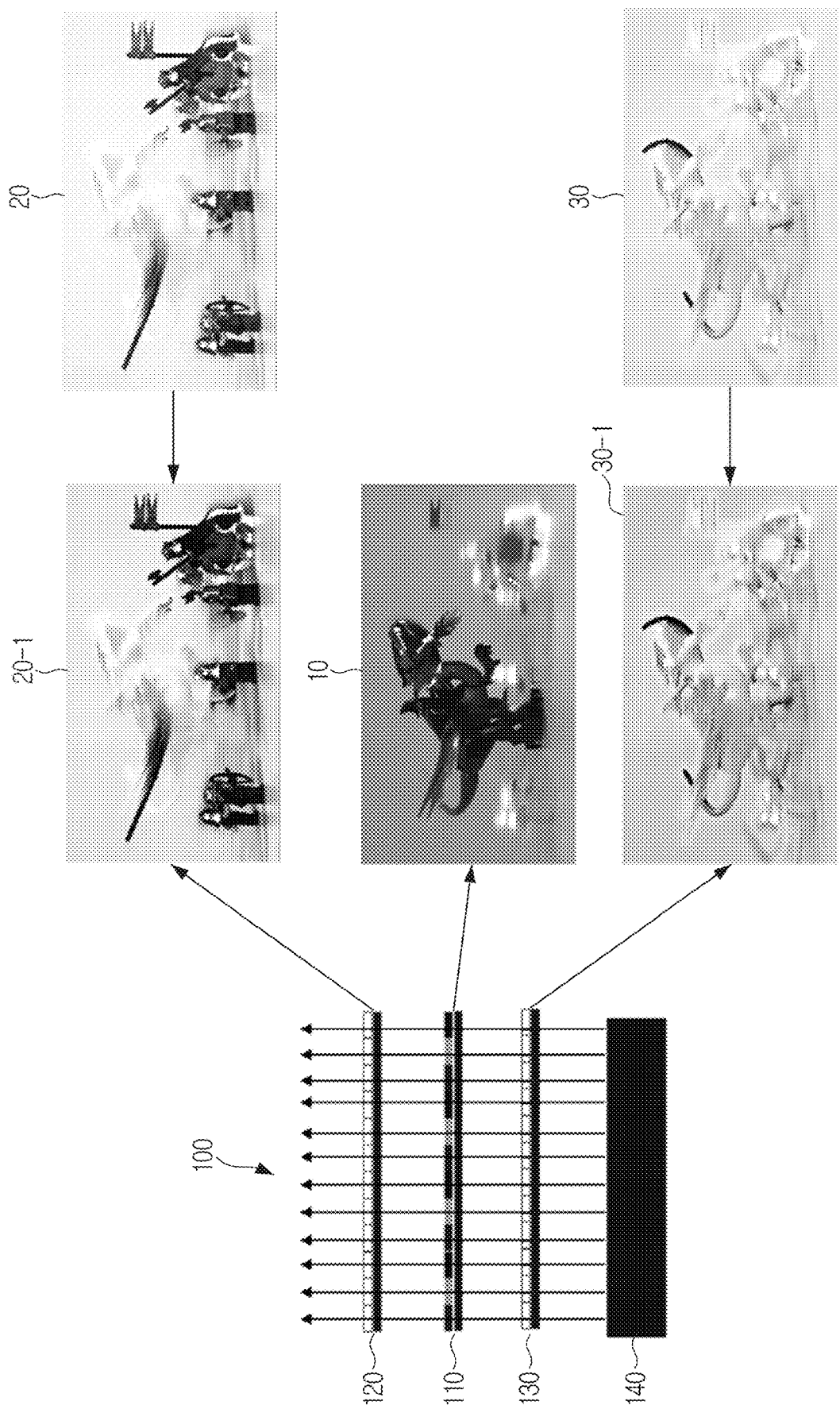
FIG. 1 is a diagram illustrating a stacked display device and a layer image displayed on each of a panel of the stacked display device according to an embodiment of the disclosure.

It is to be understood that the singular forms "a," "an," and "the" include plural referents unless the context clearly dictates otherwise. Thus, for example, reference to "a component surface" includes reference to one or more of such surfaces. FIG. 1 is a diagram illustrating a stacked display device and a layer image displayed on each of a panel of a stacked display device according to an embodiment of the disclosure.

Referring to FIG. 1, a stacked display device may include a stacked display 100 including a backlight 140, a first panel 110, a second panel 120, and a third panel 130.

The backlight 140 is configured to irradiate light to the display panel. Each of the first panel 110, the second panel 120, and the third panel 130 may be stacked on the backlight 140 of the stacked display 100, and the backlight 140 may irradiate light to each panel. As shown in FIG. 1, when the stacked display 100 includes the backlight 140, each of the first panel 110, the second panel 120, and the third panel 130 may be implemented as a liquid crystal display (LCD) panel.

Although the stacked display 100 is described as including the backlight 140 in FIG. 1, the embodiment is not limited thereto. For example, the stacked display 100 may not include a backlight unit, and each panel of the stacked display 100 may be implemented as an organic light emitting diode (OLED) panel so that light may be emitted from an organic light emitting diode (OLED) panel itself.

Referring to FIG. 1, the first panel 110 may be stacked on the third panel 130, and the second panel 120 may be stacked on the first panel 110.

The stacked display device according to the disclosure may obtain a first layer image 10 for displaying an image on the first panel 110, a second layer image 20 for displaying an image on the second panel 120, and a third layer image 30 for displaying an image on the third panel 130. According to an embodiment, the first layer image 10, the second layer image 20, and the third layer image 30 may be obtained by inputting a plurality of LF images at different views into a factorization model.

The factorization model is a model for converting a plurality of light field image (LF) images into a layer image for displaying on the stacked display 100. The LF image refers to a set of a plurality of images captured at different views through an LF camera. In one embodiment, the factorization model may be implemented as one of a deep neural network (DNN) model, a non-negative tensor factorization (NTF) model, and a non-negative matric factorization (NMF) model.

When the number of panels of the stacked display 100 is 3, a plurality of LF images may be converted into three layer images through a factorization model. A plurality of LF images captured and obtained at different views through the LF camera may be converted to a plurality of layer images corresponding to the number of the stacked display 100 panel through the factorization model. A detailed description of factorization models will now be described with reference to the following figures.

The stacked display device may display the first layer image 10 on the first panel 110, display the second layer image 20-1 having the adjusted brightness on the second panel 120, and display the third layer image 30-1 having the adjusted brightness on the third panel 130. The stacked display device may display a plurality of layer images at the same time on each of a plurality of panels to provide an image in which a three-dimensional depth is reflected.

According to the disclosure, the first panel 110 may be implemented as a color panel including a color filter, and the second panel 120 and the third panel 130 may be implemented as a monochrome panel that does not include a color filter. The first layer image 10 displayed on the first panel 110 may be a color layer image composed of 3 colors of RGB, and the second layer image 20 displayed on the second panel 120 and the third layer image 30 displayed on the third panel 130 may be a single color layer image capable of displaying only the brightness.

In the case of the first panel 110 including the color filter, the transmittance of the color filter may be lower than that of a monochrome panel without a color filter. The transmittance refers to a ratio between light amount passing a panel to light amount incident on the panel, and the higher the transmittance, the light amount passing through the panel may be relatively higher. Therefore, when an image is displayed using the first panel 110 including the color filter and the second panel 120 and the third panel 130 that do not include the color filter, a color distortion phenomenon may occur due to a difference in transmittance between the panels.

Color distortion is a phenomenon in which colors that are to be expressed through layer images and colors displayed through real panels are different, and for a stacked display including monochrome panels and color panels, the transmittance of monochrome panels is relatively higher than the transmittance of color panels, possibly causing color distortion. Since the light amount reduction level of the color panel is relatively large when an image is displayed on each panel by making the brightness of the color panel and the monochrome panel same, the image of the monochrome panel may be displayed brighter than the image of the color panel. This may result in a color distortion phenomenon in which the color displayed through the color image to be expressed and the color displayed through the real stacked display 100 are different.

In order to solve the color distortion phenomenon, the brightness of the entire monochrome panel may be set to be lower than the brightness of the entire color panel, but in this example, there may be a problem that the brightness of the final image provided through the stacked display 100 may be reduced. Accordingly, the disclosure proposes a method capable of reducing a color distortion phenomenon while minimizing the degree of brightness reduction of an image provided through the stacked display 100.

First, the stacked display device according to the disclosure may obtain a plurality of layer images 10, 20, and 30 for displaying an image on a plurality of panels 110, 120, and 130. The stacked display device may obtain a first layer image 10 for displaying an image on the first panel 110, a second layer image 20 for displaying an image on the second panel 120, and a third layer image 30 for displaying an image on the third panel 130.

The stacked display device may obtain the transmittance of each of the plurality of panels 110, 120, 130 and the pixel value of each of the second layer image 20 and the third layer image 30.

According to an embodiment, the transmittance of each of the plurality of panels 110, 120, and 130 may be identified by the polarizing plate characteristic in the panel, the type of the panel, the presence of the color filter, the presence of the lens, and the like.

For example, in the case of the first panel 110, the transmittance due to the characteristics of the lower polarizing plate is 0.8, the transmittance due to the panel characteristics is 0.28, the transmittance due to the presence of the color filter is 0.3 (if including a color filter), and the transmittance by the upper polarizing plate and the presence of lens is 0.8 (if there is no lens), the transmittance of the first panel 110 may be 0.8*0.28*0.3*0.8=0.054. In the example of the second panel 120, if the transmittance of the lower polarizing plate is 0.8, the transmittance due to the panel characteristics is 0.45, the transmittance due to the presence of the color filter is 1 (if there is no color filter), and the transmittance of the upper polarizing plate and the presence of the lens is 0.8 (if there is no lens), the transmittance of the second panel 120 may be 0.8*0.45*1*0.8=0.288. In the example of the third panel 130, if the transmittance of the lower polarizing plate is 0.43, the transmittance due to the panel characteristics is 0.45, the transmittance due to the presence of the color filter is 1 (if there is no color filter), and the transmittance by the upper polarizing plate and the presence of the lens is 0.4 (if including the lens), the transmittance of the third panel 130 may be 0.43*0.45*1*0.4=0.077. The first transmittance 0.054 of the first panel 110 including the color filter may be relatively lower than the second transmittance 0.288 of the second panel 120 and the third transmittance 0.077 of the third panel 130.

The transmittance of each of the plurality of panels may be determined at the time of panel manufacturing according to the polarizing plate characteristics in the panel, the type of the panel, the presence of the color filter, the presence of the lens, and the like, and the stacked display device may store information on the predetermined transmittance of each of the plurality of panels.

The stacked display device may obtain a pixel value of each of the second layer image 20 and the third layer image 30. The pixel refers to a minimum unit for displaying an image, and the layer image may be composed of a plurality of pixels. Each pixel in the layer image may have a pixel value.

The color layer image provided on the color panel may include a pixel representing a first color, a pixel representing a second color, and a pixel representing a third color, and a color may be represented by mixing the first color, the second color, and the third color. Each color may have a pixel value between 0 and 255. One region (the first color, the second color, the third color) within the color layer image may have the pixel value between (0,0,0) and (255, 255, 255), and the brightness may be determined by a combination of the three-color pixel values in the color layer image.

One region in the monochrome layer image provided on the mono chrome panel may have only a pixel value representing a bright-dark representation between 0 and 255, and a region in which the pixel value in the monochrome layer image is large may mean that the pixel value is brighter than a region in which the pixel value is small.

In one embodiment, the stacked display device may obtain a representative pixel value of each of the second layer image 20 and the third layer image 30. The representative pixel value according to the disclosure may mean an average value of all pixel values of a layer image. The representative pixel value according to the disclosure may have a value between 0 and 1. The representative pixel value may be a value obtained by normalizing an average value of all pixel values in a layer image having a pixel value between 0 and 255 to a value between 0 and 1.

Each pixel in the second layer image 20, which is a monochrome image, may be composed of a pixel value representing a brightness of 0 to 255, and the stacked display device may calculate an average value of a plurality of pixel values in the second layer image 20, and identify the value obtained by normalizing the calculated average value to a value between 0 and 1 as a representative pixel value of the second layer image 20. The representative pixel value of the third layer image 30 may also be identified as described above.

When a representative pixel value of each of the second layer image 20 and the third layer image 30 and the transmittance of each of the plurality of panels 110, 120, 130 is obtained, the stacked display device may adjust the brightness of the second layer image 20 based on the ratio between the first transmittance to the first panel 110 and the second transmittance to the second panel 120, and the pixel value of the second layer image 20 to obtain the second layer image 20-1 of which brightness is adjusted. The stacked display device may adjust the brightness of the third layer image 30 based on the ratio between the first transmittance to the first panel and the third transmittance to the third panel 130, and the pixel value of the third layer image to obtain the third layer image 30-1 of which brightness is adjusted.

The stacked display device may calculate an exponent value g2 for adjusting the brightness of the second layer image 20 through Equation 1.

$$(X_2^{2.2}) * \frac{\text{transmittance-of-first-panel}}{\text{transmittance-of-second-panel}} = (X_2^{2.2})^{g2} \quad \text{Equation 1}$$

The stacked display device may calculate an exponent value g3 for adjusting the brightness of the third layer image 30 through Equation 2.

$$(X_2^{2.2}) * \frac{\text{transmittance-of-first-panel}}{\text{transmittance-of-third-panel}} = (X_2^{2.2})^{g2} \quad \text{Equation 2}$$

In Equation 1, $X_2$ refers to the representative pixel value of the second layer image 20, and in Equation 2, $X_3$ represents the representative pixel value of the third layer image 30. For example, a linear equation may be calculated by calculating a linear equation with a vector of the [total number of pixels of the second layer image 20, 1]. In addition, $X_3$ may be a value representing the linear equation with a vector of the [total number of pixels of the third layer image 30, 1].

In Equation 1, $X_2^{2,2}$ refers to a substantial brightness value when the second layer image 20 is displayed on the second panel, and in Equation 2, $X_3^{2,2}$ represents the substantial brightness vale when the third layer image 30 is displayed on the third panel. The actual brightness value of the image provided through the panel may appear as a value to which an order exponential operation of degree 2.2 is applied to the representative pixel value of the image. The g2 is an exponential value for adjusting the brightness of the second layer image 20, and g3 is an exponential value for adjusting the brightness of the third layer image 30.

For example, if the first transmittance of the first panel is 0.054, the second transmittance of the second panel is 0.288, and the representative pixel value $X_2^{22}$ of the second layer image 20 is 0.275, g2 for adjusting the brightness of the second layer image 20 may be calculated as 1.59.

When the third transmittance of the third panel is 0.077, the second transmittance of the second panel is 0.288, and the representative pixel value $X_2$ of the third layer image 30 is 0.162, g2 for adjusting the brightness of the second layer image 20 may be calculated as 1.33.

When the exponent values are obtained through the above equations, the stacked display device may adjust the brightness of the second layer image 20 based on the exponent value g2 for adjusting the brightness of the third layer image 30, and adjust the brightness of the third layer image 30 on the basis of the exponent value g3 for adjusting the brightness of the third layer image 30 to obtain the third layer image 30-1 having the adjusted brightness.

The stacked display device may obtain the second layer image 20-1 of which brightness is adjusted by applying an exponential operation of degree g2 to each pixel value in the second layer image 20. The stacked display device may adjust each pixel value in the second layer image 20 such that the representative pixel value of the second layer image 20 becomes $X_2^g$ that is a representative pixel value of the second layer image 20, thereby obtaining the second layer image 20-1 of which brightness is adjusted such that the brightness is reduced compared to the second layer image 20. In other words, referring to FIG. 1, the second layer image 20-1 having the adjusted brightness may be represented to be darker in overall than the second layer image 20, so that the brightness of the second layer image 20-1 having the adjusted brightness may be relatively lower than the brightness of the second layer image 20.

The actual brightness value when displaying the second layer image 20-1 with the adjusted brightness on the second panel is $X_2^{(g+2,2)}$, and referring to Equation 1, $X_2^{(g+2,2)}$ is the same as the brightness value with the brightness reduced by the transmittance ratio between the first panel and the second panel from the actual brightness when the second layer image 20 is displayed on the second panel.

The stacked display device may obtain the third layer image 30-1 of which brightness is adjusted by applying a g3 degree exponential operation to each pixel value in the third layer image 30. The stacked display device may adjust each pixel value in the third layer image 30 so that the representative pixel value of the third layer image 30 becomes $X_3^g$, thereby obtaining the third layer image 30-1 having the adjusted brightness.

The stacked display device may display the first layer image 10 on the first panel 110, display the second layer image 20-1 having the adjusted brightness on the second panel 120, and display the third layer image 30-1 having the adjusted brightness on the third panel 130. The stacked display device may adjust and display the brightness of the second layer image 20 and the third layer image 30, thereby reducing a color distortion phenomenon.

As described above, when the brightness of the layer image is adjusted through the exponent values for adjusting the brightness of the layer image, an exponential operation may be applied to each pixel value of the corresponding pixel with respect to the pixel in the layer image to obtain a layer image of which brightness is adjusted. In this example, since the degree of brightness reduction is different for each pixel in the layer image, the brightness reduction degree of the final image is minimized, and the final image well reflecting the color to be expressed through the layer image may be provided. Since the brightness of the layer image is adjusted through the representative pixel value for each content of the layer image, the color sense to be expressed through the layer image may be maintained even through the final image provided through the plurality of panels.

Although only an example in which the transmittance of the panel is different from that of the color filter is described, the disclosure is not limited thereto, and the transmittance of the panel may be different depending on whether the type of panel and the type lens of the polarizing film are attached. For example, the brightness of a layer image according to the disclosure may be adjusted in a stacked display device including three color panels having different transmittance of the panel, thereby reducing color distortion.

Although the stacked display 100 is described as being implemented as a single color panel and two monochrome panels, the disclosure is not limited thereto. The stacked display 100 may be implemented as a single color panel and one monochrome panel. The stacked display 100 may be implemented as a first color panel and a second color panel having a different transmittance from the first color panel.

Figure 2:
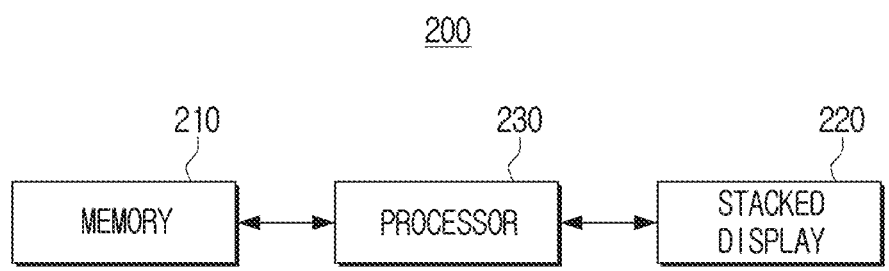
FIG. 2 is a block diagram illustrating a configuration of a stacked display device according to an embodiment of the disclosure.

FIG. 2 is a block diagram illustrating a configuration of a stacked display device according to an embodiment of the disclosure.

Referring to FIG. 2, a stacked display device 200 may include a memory 210, a stacked display 220, and a processor 230. The stacked display device 200 according to the disclosure may be implemented as a device for providing a stereoscopic image by including a plurality of display panels.

The memory 210 may store various programs and data necessary for operation of the stacked display device 200. Specifically, at least one instruction may be stored in the memory 210. The processor 230 may perform an operation of the stacked display device 200 by executing instructions stored in the memory 210.

The memory 210 may store instructions or data related to at least one other component of the stacked display device 200. The memory 210 may be implemented as a non-volatile memory, a volatile memory, a flash-memory, a hard disk drive (HDD), a solid state drive (SSD), or the like. The memory 210 may be accessed by the processor 230, and read/write/modify/update, etc. of data by the processor 230 may be performed. The term memory in the disclosure may include a memory 210, a read-only memory (ROM) (not shown) in the processor 230, a random access memory (RAM) (not shown), or a memory card (not shown) (e.g., a micro secure digital (SD) card, a memory stick) mounted on the stacked display device 200.

In an embodiment of the disclosure, the stacked display 220 may include the backlight 140 and a plurality of panels stacked on the backlight 140, as shown in FIG. 1. That is, when the stacked display 100 includes the backlight 140, each of the plurality of panels may be implemented as a liquid crystal display (LCD) panel.

According to an embodiment of the disclosure, each of the plurality of panels of the stacked display 220 may be implemented as an organic light emitting diode (OLED) panel to emit light from each OLED panel itself. In this example, the stacked display 220 may not include a backlight.

According to an embodiment of the disclosure, the stacked display 220 may include the first panel 110, the second panel 120, the third panel 130, and the backlight 140 as shown in FIG. 1. The first panel 110 may be implemented as a color panel including a color filter, and the second panel 120 and the third panel 130 may be implemented as a monochrome panel that does not include a color filter. In this example, the first layer image 10 displayed on the first panel 110 may be a color layer image composed of RGB color, and the second layer image 20 displayed on the second panel 120 and the third layer image 30 displayed on the third panel 130 may be a single color layer image capable of displaying only the brightness and darkness.

However, the stacked display 220 may include the first panel 110 which is the color panel and the second panel 120 which is the monochrome panel.

The third panel 130, which is a monochrome panel, may be stacked on the backlight 140. The light emitted from the backlight 140 may be incident on the lower region of the third panel 130.

The first panel 110, which is a color panel, may be stacked on the third panel 130. The light emitted from the backlight 140 may pass through the third panel 130, and the light passing through the third panel 130 may be incident on the lower region of the first panel 110.

The second panel 120, which is a monochrome panel, may be stacked on the first panel 110. The light emitted from the backlight 140 may pass through the third panel 130 and the first panel 110, and the light passing through the first panel 110 may be incident on the lower region of the second panel 120.

In addition, according to an embodiment of the disclosure, the third panel 130 may include a lens for improving a field of view. For example, the lens may be implemented as a multi-array lens. The multi-array lens is configured to diffuse light passing through one pixel by a pitch of a multi-array lens. The multi-array lens may be implemented as, for example, a lenticular lenslet array, or the like, but is not limited thereto, and may be implemented as various lenses for diffusing light.

In the example of the first panel 110 including the color filter, the transmittance may be lower than that of a monochrome panel without a color filter. The transmittance refers to the ratio of light amount passing through the panel against the amount of light incident on the panel, and the higher the transmittance, the higher the amount of light passing through the panel may be. Therefore, when an image is displayed using the first panel 110 including the color filter and the second panel 120 and the third panel 130 that do not include the color filter, a color distortion phenomenon may occur due to a difference in transmittance between the panels.

When the third panel 130 includes a multi-array lens, the transmittance of the multi-array lens may be lower than that of a monochrome panel without a multi-array lens due to the impact of the multi-array lens.

Table 1 is a table to describe transmittance of each of the first panel to the third panel.

TABLE 1

| | lower polarizing plate characteristics | panel characteristics | color filter | upper polarizing plate characteristics | transmittance |
|---|---|---|---|---|---|
| second panel | 0.8 | 0.45 | 1 | 0.8 | 0.288 |
| first panel | 0.8 | 0.28 | 0.3 | 0.8 | 0.054 |
| third panel | 0.43 | 0.45 | 1 | 0.4 | 0.077 |

Referring to Table 1, in the case of the first panel 110 including the color filter, when the transmittance of the lower polarizing plate is 0.8, the transmittance due to the panel characteristics is 0.28, the transmittance due to the presence of the color filter is 0.3 and the transmittance by the upper polarizing plate and the presence of the lens is 0.8 (not including lens), the transmittance of the first panel 110 may be 0.8*0.28*0.3*0.8=0.054. In the case of the second panel 120, when the transmittance due to the characteristics of the lower polarizing plate is 0.8, the transmittance due to the panel characteristics is 0.45, the transmittance due to the presence of the color filter is 1 (not including the color filter), and the transmittance by the upper polarizing plate and the presence of the lens is 0.8 (not including lens), the transmittance of the second panel 120 may be 0.8*0.45*1*0.8=0.288. In the case of the third panel 130 including the multi-array lens, when the transmittance of the lower polarizing plate is 0.43, the transmittance due to the panel characteristics is 0.45, the transmittance due to the presence of the color filter is 1 (not including the color filter), and the transmittance of the upper polarizing plate and the presence of the lens is 0.4 (including lens), the transmittance of the third panel 130 may be 0.43*0.45*1*0.4=0.077. The first transmittance 0.054 of the first panel 110 including the color filter may be relatively lower than the second transmittance 0.288 of the second panel 120 and the third transmittance 0.077 of the third panel 130. The transmittance of each of the plurality of panels may be pre-determined according to the characteristics of the polarizing plate in the panel, the type of the panel, the presence of the color filter, the presence of the lens, and the memory 210 of the stacked display device 200 may store information on the predetermined transmittance of each of the plurality of panels. A function related to artificial intelligence may operate through the processor 230 and the memory 210.

The processor 230 may be configured with one or a plurality of processors. At this time, one or a plurality of processors may be a general purpose processor, such as a central processing unit (CPU), an application processor (AP), or the like, a graphics-only processor such as graphics processing unit (GPU), visual processing unit (VPU), or the like, or an AI-dedicated processor such as neural network processing unit (NPU).

The one or more processors control the processing of the input data according to a predefined operating rule or AI model stored in the memory. The predefined operating rule or AI model is made through learning. Here, that the AI model is made through learning may refer that the learning algorithm is applied to a plurality of learning data, so that a predefined operating rule or AI model of a desired characteristic is generated. The learning of the AI model may be performed in a device itself in which AI according to the disclosure is performed, and may be implemented through a separate server/system.

The AI model may include a plurality of neural network layers. Each layer has a plurality of weight values, and performs a layer operation through a result of calculation of a previous layer and an operation of a plurality of weights. Examples of neural networks include, but are not limited to, a convolutional neural network (CNN), a deep neural network (DNN), a recurrent neural network (RNN), a Restricted Boltzmann Machine (RBM), a Deep Belief Network (DBN), a Bidirectional Recurrent Deep Neural Network (BRDNN), and a Deep Q-Networks, and the neural network in the disclosure is not limited to the above-described example.

The processor 230 may be electrically connected to the memory 210 and may control overall operations and functions of the stacked display device 200.

The stacked display 220 according to the disclosure may be implemented as a display including two panels of a first panel and a second panel. In this example, the first panel and the second panel may be arranged to be parallel to each other, and may have a structure in which the first panel and the second panel are stacked in a direction perpendicular to the surface. The second panel may also be stacked on the first panel. The first panel may be a color panel including a color filter, and the second panel may be a monochrome panel that does not include a color filter.

However, the stacked display 220 according to the disclosure may be implemented as a display including three panels of a first panel, a second panel, and a third panel. The first panel, the second panel, and the third panel may be arranged to be parallel to each other, and may have a structure in which the first panel, the second panel, and the third panel are stacked in a direction perpendicular to the surface. The first panel may be stacked on the third panel, and the second panel may be stacked on the first panel. The third panel may be disposed in a lower portion (or a rear direction) than the first panel and the second panel, and the second panel may be disposed on an upper portion (or an upper surface direction) than the third panel and the first panel such that the third panel may be disposed between the first panel and the third panel. The first panel may be a color panel including a color filter, and the second panel and the third panel may be a monochrome panel that does not include a color filter.

The monochrome panel does not include a color filter, and the layer image displayed on the monochrome panel may be a layer image to represent only a contrast ratio. For example, the monochrome panel may display a layer image composed of a single color of a black and white, and a contrast ratio may be expressed through pixel values in the layer image.

The color panel includes a color filter, which may include a pixel representing a first color, a pixel representing a second color, and a pixel representing a third color. The color may be expressed by mixing the first color, the second color, and the third color. For example, a pixel of a color panel may be implemented as a pixel having three colors of red, green, and blue pixels by a color filter.

In one embodiment, when the stacked display 220 is implemented as a display including two panels of the first panel and the second panel, the processor 230 may execute at least one instruction stored in the memory 210 to obtain a first layer image for displaying an image on the first panel 110 and a second layer image for displaying an image on the second panel. The first layer image may be an image capable of displaying a color by mixing three colors of red, green, and blue (RGB). The second layer image may be a black-white image. The first layer image and the second layer image may be obtained by factorization of an LF image of different views, as described below.

In one embodiment, when the stacked display 220 is implemented as a display including three panels of the first panel, the second panel, and the third panel, the processor 230 may execute at least one instruction stored in the memory 210 to obtain a first layer image for displaying an image on the first panel 110 and a second layer image for displaying an image on the second panel, and a third layer image for displaying an image on the third panel. The first layer image may be an image capable of displaying a color by mixing three colors of RGB. The second layer image and the third layer image may be a monochrome image of black and white. The first layer image to the third layer image may be obtained by factorization of an LF image of different views, as will be described later.

In order to provide an image to the stacked display 220 including the two panels, the stacked display device 200 may input an LF image into a factorization model to obtain two layer images. In order to provide an image to the stacked display 220 including the three panels, the stacked display device 200 may input an LF image into a factorization model to obtain three layer images.

The factorization model is a model for converting a plurality of light field image (LF) images into a layer image for displaying on the stacked display 100. The LF image refers to a set of a plurality of images captured at different views through an LF camera. In one embodiment, the factorization model may be implemented as one of a deep neural network (DNN) model, a non-negative tensor factorization (NTF) model, and a non-negative matric factorization (NMF) model.

Figure 3:
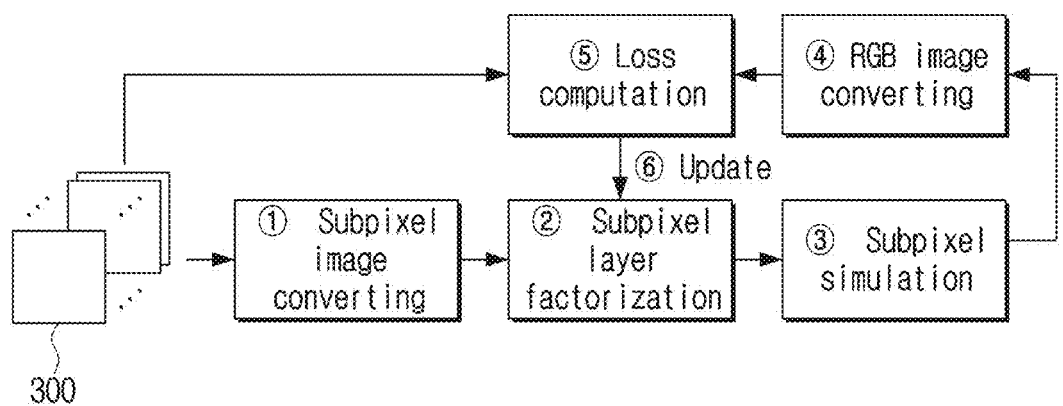
FIG. 3 illustrates a process of training a factorization model according to an embodiment of the disclosure.

The factorization model may be trained through the process of FIG. 3, and the model may be updated. FIG. 3 is a diagram illustrating a process of training a factorization model according to an embodiment of the disclosure.

Referring to FIG. 3, a processor 230 may obtain an LF image 300 at a plurality of views, and convert the obtained LF image 300 into a subpixel LF image (①) Subpixel image converting).

For example, each LF image 300 obtained by the processor 230 may be an LF image 300 composed of a three-channel image of RGB. That is, one image of the plurality of LF images 300 at different views may be composed of a red channel image to express a red color, a green channel image to express a green color, and a blue channel image to express a blue color. In this example, the processor 230 may convert a three-channel image included in each of the plurality of LF images 300 at different views into an image of one channel to obtain a subpixel LF image. The details will be described later with reference to FIG. 6.

The processor 230 may obtain the number of layer images corresponding to the number of panels of the stacked display 220 by factorization of the subpixel LF image (② Subpixel layer factorization). The processor 230 may obtain at least two layer images through a factorization model for performing factorization, and a detailed description thereof will be described later with reference to FIG. 6.

The processor 230 may simulate at least two layer images obtained through the factorization model (③ Subpixel simulation) to restore the subpixel LF image. The processor 230 may input at least two layer images into the subpixel simulation model to restore the subpixel LF image, and the detailed description thereof will be described later with reference to FIG. 6.

The processor 230 may convert the restored subpixel LF image into a three-channel LF image format (④ RGB image converting). The processor 230 may restore the subpixel LF image, which is a set of image formats of one channel, in the form of an LF image of a three-channel image format.

The processor 230 may compare the LF image 300 with the LF image converted by the ④ RGB image converting to obtain a loss function (⑤ Loss computation). The loss function is an exponent indicating the current learning state of the factorization model and may train a factorization model based on a loss function (⑥ Update). The loss function is an exponent indicating a poor performance of the current performance for the artificial intelligence model and the artificial intelligence model may be trained in a direction in which a loss function decreases. This will be described later with reference to FIG. 6.

The processor 230 may train the factorization model through the processes ① to ⑥.

The processor 230 may adjust the brightness of the second layer image based on the ratio between the first transmittance to the first panel and the second transmittance to the second panel and the pixel value of the second layer image to obtain the second layer image having the adjusted brightness.

Referring to Table 1, the ratio between the first transmittance (0.054) for the first panel and the second transmittance (0.288) for the second panel $$\left(\frac{\text{transmittance of first panel}}{\text{transmittance of second panel}} = 0.1875\right)$$

may be obtained.

The processor 230 may obtain a pixel value of the second layer image. In one embodiment, the pixel value of the second layer image may be a representative pixel value of the second layer image. The representative pixel value may mean an average value of all pixel values of the layer image. The representative pixel value according to the disclosure may have a value between 0 and 1. The representative pixel value may be a value obtained by normalizing an average value of all pixel values in a layer image having a pixel value between 0 and 255 to a value between 0 and 1. That is, each pixel in the second layer image 20, which is a monochrome image, is composed of a pixel value representing a brightness of 0 to 255, and the stacked display device may calculate an average value of a plurality of pixel values in the second layer image 20, and identify the calculated average value as a representative pixel value of the second layer image 20 with a value of 0 to 1.

The processor 230 may obtain an exponential value g2 for adjusting the brightness of the second layer image through Equation 1 based on the ratio between the first transmittance and the second transmittance for the second panel and the pixel value ($X_2$) of the second layer image. For example, when the ratio between the first transmittance and the second transmittance is 0.1875, and the representative pixel value ($X_2$) of the second layer image is 0.275, the exponential value g2 may be calculated as 1.59.

In Equation 1, $X_2^{2.2}$ may represent the real brightness value when the second layer image is displayed on the second panel. The real brightness value of the image provided through the panel may appear as a value to which a 2.2 degree exponential operation is applied to the representative pixel value of the image. The g2 may be an exponential value for adjusting the brightness of the second layer image 20.

When an exponential value g2 for adjusting the brightness of the second layer image is obtained, the processor 230 may adjust the brightness of the second layer image based on the exponent value g2 to obtain a second layer image having the adjusted brightness. The second layer image having the brightness adjusted through the pixel values to which the exponential operation of the exponent value g2 is applied to each pixel value in the second layer image may be obtained.

Although the above-described embodiment has been described as adjusting the brightness of the layer image through the exponent value obtained based on the representative pixel value of the layer image, the disclosure is not limited thereto. The processor 230 may obtain representative pixel values for each object included in the layer image, and obtain exponent values corresponding to the representative pixel values for each object. The processor 230 may apply an exponent value corresponding to each object for each object in the layer image to obtain a layer image of which brightness is adjusted.

For example, when the second layer image is a video, the processor 230 may obtain an exponential value on the basis of the average pixel value of the entire moving picture frame. The processor 230 may obtain a second layer image of which brightness is adjusted based on the obtained exponent value. However, the processor 230 may obtain exponent values on the basis of the average pixel values for each video frame or a predetermined frame interval. The processor 230 may adjust brightness for each frame or a predetermined frame interval based on the obtained exponent values to obtain a second layer image of which brightness is adjusted.

Figure 4:
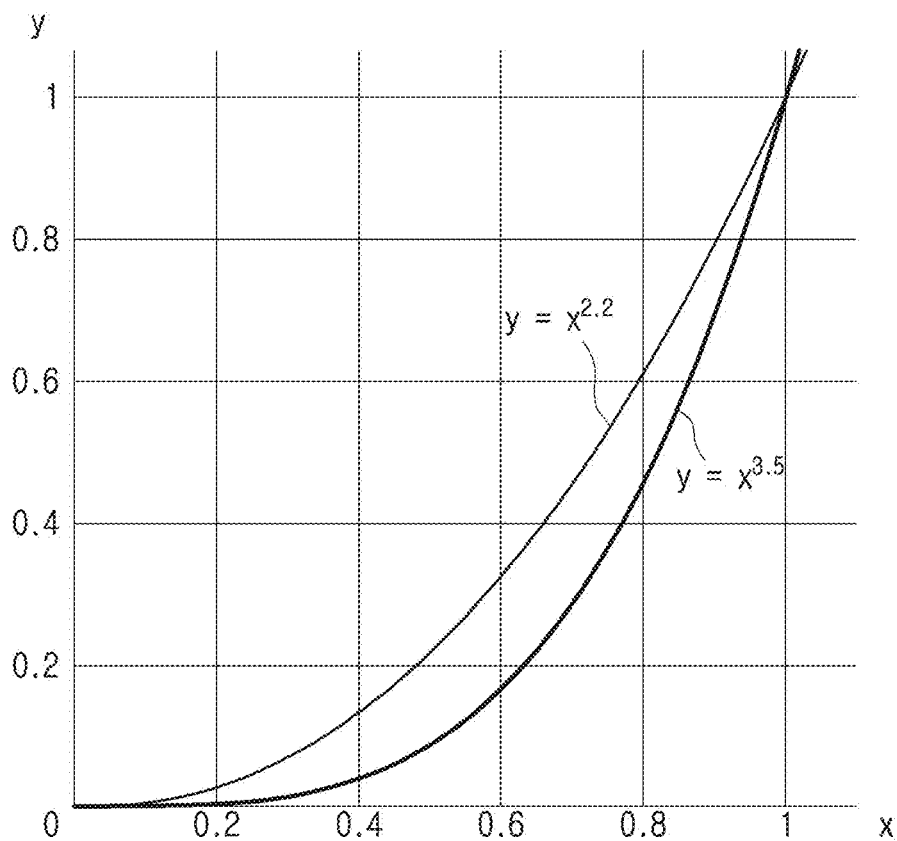
FIG. 4 is a graph illustrating brightness information of a general image and brightness information of an image to which an exponential value is applied according to an embodiment of the disclosure.

FIG. 4 is a graph illustrating brightness information of a general image and brightness information of an image to which an exponential value is applied according to an embodiment of the disclosure.

The graph $y=x^{2.2}$ of FIG. 4 is a graph that represents brightness information (y) corresponding to each pixel value by pixel values (x) in a general image, and the graph for $y=x^{3.5}$ is a graph that represents brightness information (y) corresponding to each pixel value by pixel value (x) in the image where an exponential value of 1.59 is applied in the general image and the brightness adjusted.

As illustrated in FIG. 4, the pixel value x in the image is a value between 0 and 1, and for example, a pixel value of 0 to 255 may be normalized to a value between 0 and 1.

Referring to FIG. 4, it may be seen that the brightness of an image of which brightness is adjusted according to the exponent value is relatively lower than the brightness of the general image according to each pixel. That is, a layer image of which brightness is adjusted by applying an exponential value may be relatively brighter than a layer image prior to brightness adjustment.

Figure 5A:
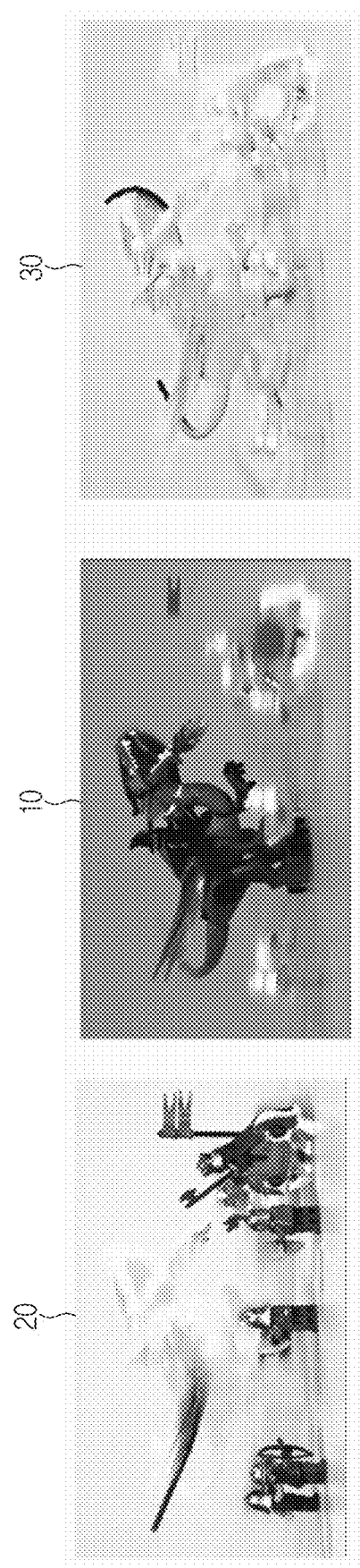
FIG. 5A is a diagram illustrating a plurality of layer images before brightness adjustment when a panel of a stacked display is three according to an embodiment of the disclosure.

FIG. 5A illustrates a plurality of layer images before brightness adjustment when a panel of a stacked display 220 is three according to an embodiment of the disclosure, and FIG. 5B illustrates a plurality of layer images of which brightness is adjusted according to an exponent value corresponding to each of the layer images according to an embodiment of the disclosure.

Referring to FIG. 5A, a first layer image 10 of FIG. 5A is a layer image for displaying on a first panel including a color filter, and for example, the first layer image 10 may be a color image. The second layer image 20 may be a layer image for obtaining the second layer image 20-1 of which the brightness for displaying on the second panel 120 is adjusted, and for example, the second layer image 20 and the second layer image 20-1 having the adjusted brightness may be a monochromatic black-white image. The third layer image 30 is a layer image for obtaining the third layer image 30-1 having the adjusted brightness for display on the third panel, and for example, the third layer image 30 and the third layer image 30-1 having the adjusted brightness may be a monochromatic black-white image. The first panel for displaying the first layer image 10 is a panel for adjusting the brightness of the second layer image 20 and the third layer image 30, and brightness of the first layer image 10 may not be adjusted.

Referring to FIG. 5B, a processor 230 may obtain a second layer image 20-1 of which a brightness of FIG. 5B is adjusted based on a ratio between a first transmittance for a first panel and a second transmittance for a second panel and a pixel value of a second layer image 20 of FIG. 5A.

The processor 230 may obtain the third layer image 30-1 of which the brightness of FIG. 5B is adjusted based on the ratio between the first transmittance for the first panel and the third transmittance for the third panel and the pixel value of the third layer image 30 of FIG. 5A.

The processor 230 may control the stacked display 220 to display the first layer image 10 on the first panel, display the second layer image 20-1 having the adjusted brightness on the second panel, and display the third layer image 30-1 having the adjusted brightness on the third panel.

However, the disclosure is not limited to the disclosure of FIGS. 5A and 5B, and when the stacked display 220 is implemented as a first panel and a second panel, the processor 230 may control the stacked display 220 to display the first layer image on the first panel while displaying the second layer image of which brightness is adjusted on the basis of the transmittance ratio between the first panel and the second panel and the second layer image for display on the second panel. The stacked display 220 may be implemented as a first panel, which is a color panel, and two or more monochrome panels, and in this example, the processor 230 may control the stacked display 220 to adjust the brightness of the layer image to be displayed on each monochrome panel to display a layer image of which brightness is adjusted on each monochrome panel.

Figure 6:
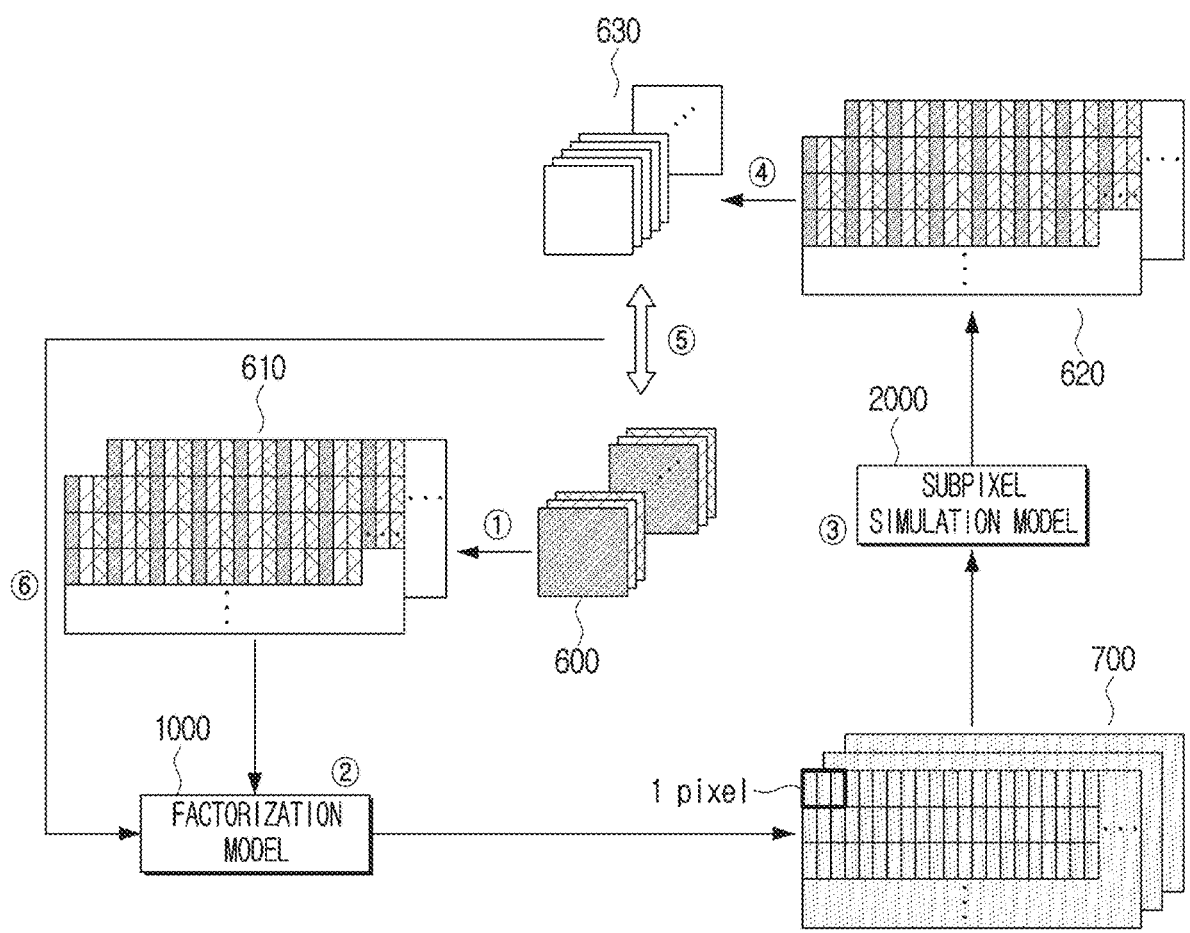
FIG. 6 is a diagram illustrating a process for training a factorization model, according to an embodiment of the disclosure.

FIG. 6 is a diagram illustrating a process for training a factorization model, according to an embodiment of the disclosure.

Referring to FIG. 6, a stacked display device 200 may obtain an LF image 600 composed of three channels. As described with reference to FIG. 3, one image in the LF image 600 may be composed of a red color channel image for expressing red color, a green color channel image for expressing a green color, and a blue color channel image for expressing a blue color. The LF image 600 may include an LF image for the first view to an LF image for the Nth view, and the LF image for each view may be composed of a three-channel image.

The stacked display device 200 may convert the LF image 600 composed of three channels into an image of one channel, and may obtain a subpixel LF image 630 (①) Subpixel image converting).

Figure 7A:
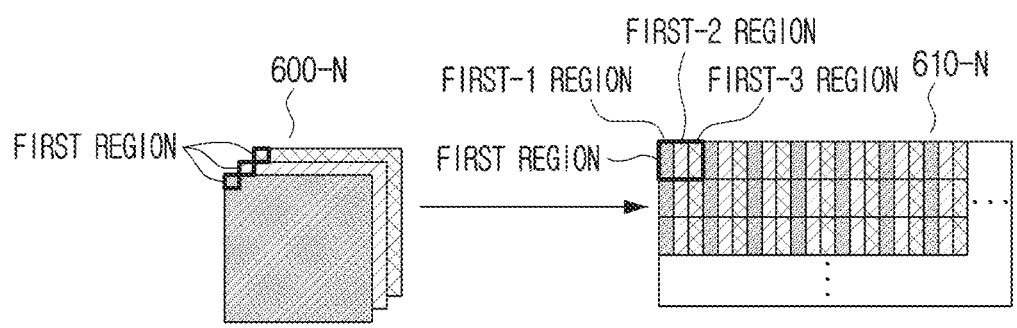
FIG. 7A is a diagram illustrating an example of obtaining a subpixel LF image for an $N^{th}$ view by converting an LF image for an $N^{th}$ view into one channel among a plurality of LF images according to an embodiment of the disclosure.

FIG. 7A is a diagram illustrating that an LF image for an Nth view is converted to one channel, and a subpixel LF image for an Nth view is obtained according to an embodiment of the disclosure.

Referring to FIG. 7A, an LF image 600-N for an Nth view may be composed of three channels, and may be composed of a red-channel image for expressing red color, a green-channel image for expressing a green-color, and a blue-channel image for expressing a blue-color. The stacked display device 200 may obtain a subpixel LF image 610-N by sequentially arranging the subpixel regions corresponding to each other in each channel image.

The pixels corresponding to the first region may be sequentially arranged in each of the three channels of the LF image 600-N with respect to the Nth view to obtain the subpixel LF image 610-N for the Nth view. The stacked display device 200 may be converted such that a pixel corresponding to the first region in the red channel image of the LF image 600-N for the Nth view is disposed in the first-1 region of the subpixel LF image 610-N for the Nth view, and a pixel corresponding to the first region in the green channel image is disposed in the first-2 region which is the right region in the first-1 region of the subpixel LF image 610-N. The stacked display device 200 may convert a pixel corresponding to a first region in the blue channel image of the LF image 600-N for the Nth view to be disposed in the first-3 region of the subpixel LF image 610-N that is the right region in the first-2 region of the subpixel LF image 610-N for the Nth view. The stacked display device 200 may obtain the subpixel LF image 610-N for the Nth view by performing the above-described process for all regions of the pixel.

Figure 7B:
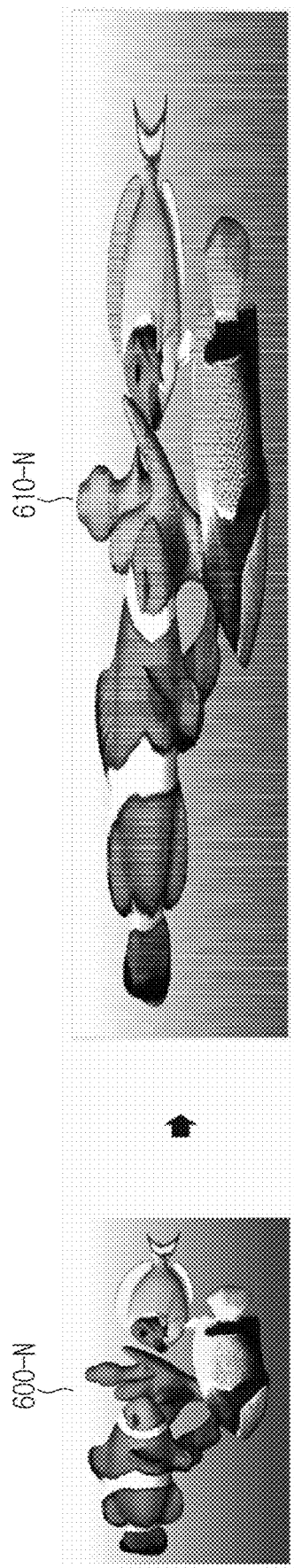
FIG. 7B is a view illustrating an image converted into a one-channel subpixel LF image from a three-channel LF image according to an embodiment of the disclosure.

FIG. 7B is a view illustrating an image converted into a one-channel subpixel LF image from a three-channel LF image according to an embodiment of the disclosure.

Referring to FIG. 7B, a subpixel LF image 610-N for an Nth view may be an image as if an LF image 600-N for the Nth view is extended by three times vertically.

The stacked display device 200 may convert a three-channel image into one channel image as described above with respect to each of the plurality of LF images 600 to obtain a subpixel LF image 610.

When the subpixel LF image 610 is obtained, the stacked display device 200 may input the obtained subpixel LF image 610 to a factorization model 1000 to obtain a plurality of subpixel layer images 700 (② Subpixel layer factorization). The factorization model 1000 according to the disclosure is a model for converting a plurality of subpixel LF images into a plurality of subpixel layer images.

In one embodiment, the factorization model 1000 may be implemented as one of a deep neural network (DNN) model, a non-negative tensor factorization (NTF) model, and a non-negative matric factorization (NMF) model, and the stacked display device 200 may enhance the performance of the factorization model 1000 by training the factorization model 1000 through ① to ⑥ of in FIG. 6.

The plurality of subpixel layer images 700 are a plurality of images converted to display a plurality of subpixel LF images 610 at different views in the stacked display 220. The factorization model 1000 may output a plurality of subpixel layer images 700 corresponding to the number of panels of the stacked display 220.

The stacked display device 200 may restore the plurality of subpixel layer images 700 to the subpixel LF image 620 through a subpixel simulation model 2000 (③ Subpixel simulation). The subpixel LF image 620 is an image that restores the plurality of subpixel layer images 700 to a subpixel LF image format to train the factorization model 1000. A method of obtaining the restored subpixel LF image 620 through the subpixel simulation model 2000 will be described later with reference to FIGS. 8A and 8B.

The stacked display device 200 may convert the restored subpixel LF image 620 into a three-channel LF image 630 (④ RGB image converting). The stacked display device 200 may convert the restored subpixel LF image 620 composed of one channel into the restored LF image 630 by performing the procedure described in FIG. 7A reversely.

The stacked display device 200 may obtain a loss function by comparing the restored LF image 630 and the LF image 600 (⑤ Loss computation).

The loss function refers to an exponent indicating a current learning state of the loss function model, and a current learning state of the factorization model 1000 may appear based on the loss function. According to an embodiment of the disclosure, learning of the factorization model 1000 may be performed on the basis of a loss function as shown in Equation 3.

$$\min_{w,b} \sum_{i=total\text{-}view\text{-}num} \text{Loss}\left(X_i - \text{simulator}(f_1, \ldots, f_{number\text{-}of\text{-}layer})\right) \quad \text{Equation 3}$$

In Equation 3, $X_i$ is the $i^{th}$ image of a plurality of images included in the LF image 600, and $f_1$ shows the first layer image among a plurality of layer images. Here, 'total_view_num' represents the total number of LF images 600, and "number of layer" represents the number of multiple layer images.

The simulator($f_1, \ldots, f_{number\text{-}of\text{-}layer}$) may refer to a restored LF image 630 using all of the plurality of subpixel layer images 700. The Equation 3 refers to the loss function which is obtained through loss computation by comparing the restored LF image 630 with each of the plurality of images included in the LF image 600 and summation of each of the calculated loss. The stacked display device 200 may perform training on the factorization model 1000 in the direction in which the loss function becomes minimal.

The stacked display device 200 may train the factorization model 1000 based on the loss function (⑥ Update).

Although FIG. 6 illustrates that the factorization model 1000 is a model for receiving the subpixel LF image 610 and outputting the plurality of subpixel layer images 700, the disclosure is not limited thereto. The disclosure may be implemented through a factorization model for outputting a plurality of layer images of three channels, as shown in FIG. 5A, by receiving a three-channel LF image 600 instead of the subpixel LF image 610. In this example the stacked display device 200 may restore a plurality of layer images of a three-channel output through a factorization model into a three-channel LF image format, compare the restored LF image with the LF image 600 to obtain a loss function, and train a factorization model on the basis of the loss function.

Figure 8A:
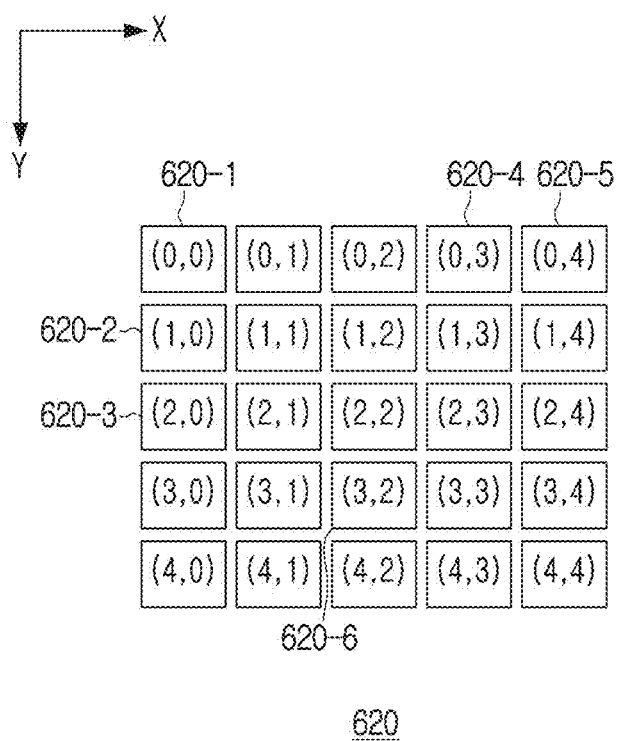
FIG. 8A is a diagram illustrating a set of LF images of one channel composed of 5×5 according to an embodiment of the disclosure.

FIG. 8A is a diagram illustrating a set of LF images of one channel composed of 5×5 according to an embodiment of the disclosure.

Referring to FIG. 8A, an LF image 620 of FIG. 8A may include 25 view images of one-channel corresponding to each view, such as a subpixel LF image 610-N of the one-channel of the Nth view of FIG. 7A. The LF image 620 according to the disclosure may include a plurality of restored one-channel view images that are photographed at 25 views, as shown in FIG. 8A. For example, the LF image 620 may be a restored image by inputting a plurality of subpixel layer images 700 to the simulation model 2000. The simulation model 2000 is a model for restoring a plurality of subpixel layer images in an LF image format in order to train the factorization model 1000. Specifically, the simulation model 2000 may apply a shifting parameter for each view to the plurality of subpixel layer images 700 to shift the at least one subpixel layer image, and then may crop the shifted plurality of subpixel layer images to reconstruct the LF image 620. For example, an average value of a pixel value of an overlapping area of a plurality of subpixel layer images may be set as a pixel value of a corresponding area to restore the LF image 620. However, the value obtained by multiplying the pixel values of the overlapping regions of the plurality of subpixel layer images may be set as a pixel value of the corresponding region, or a value obtained by adding all the pixel values of the overlapping region of the plurality of subpixel layer images may be set as a pixel value of the corresponding region so that the LF image 620 is restored.

Figure 8B:
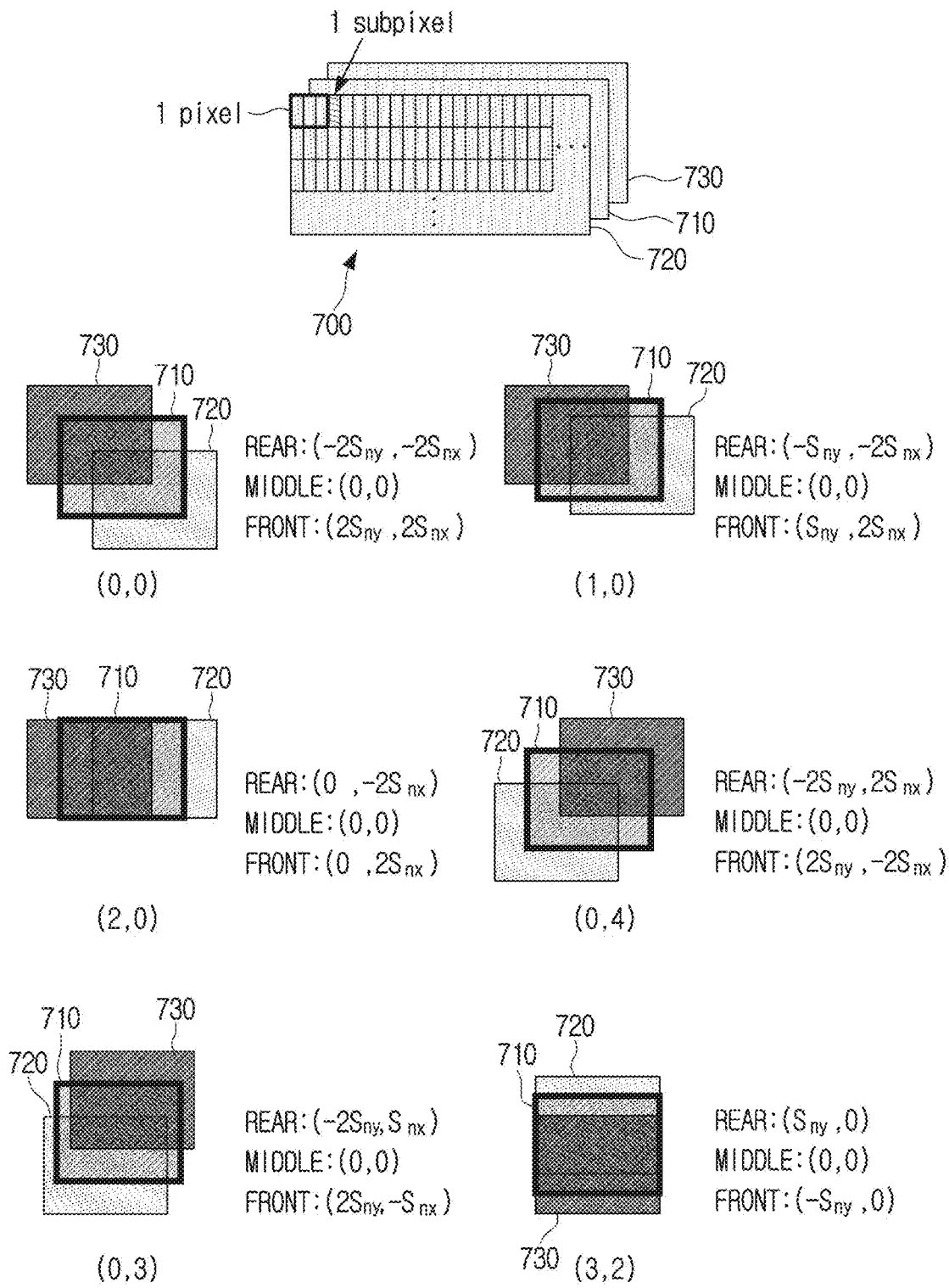
FIG. 8B is a view illustrating a method in which three layer images are shifted according to a view corresponding to each LF image to restore an LF image according to an embodiment of the disclosure.

In one embodiment, the plurality of subpixel layer images 700 may include a first subpixel layer image (e.g., middle layer image 710), a second subpixel layer image (e.g., front layer image 720), and a third subpixel layer image (e.g., rear layer image 730). As shown in FIG. 8B, the stacked display device 200 may shift the first subpixel layer image (e.g., middle layer image 710) and the third subpixel layer image (e.g., rear layer image 730) differently according to 25 views, and may obtain a plurality of one-channel LF images 620 that have been restored as photographed at 25 views of FIG. 8A. The second subpixel layer image (e.g., front layer image 720) and the third subpixel layer image (e.g., rear layer image 730) may be applied with shifting parameters Sn differently according to views to the second subpixel layer image (e.g., front layer image 720) and the third subpixel layer image (e.g., rear layer image 730) and the one-channel LF image 610 may be restored. The shifting parameter Sn denotes a representative depth value included in the LF image, and the stacked display device 200 may shift the plurality of subpixel layer images 700 according to the value of the shifting parameter Sn to obtain the restored LF image 620. For example, when the shifting parameter Sn is 3 (Snx=3, Sny=3), (3, 2) view image 620-6 may be shifted by the middle layer image 710 reference (3, 0) subpixel, and the front layer image 720 may be shifted by the middle layer image 710 reference (−3, 0) subpixel. In the shifting parameter Sn, a value of the shifting parameter Snx in an X-axis direction and a shifting parameter Sny in a Y-axis direction may be the same but the embodiment is not limited thereto.

The LF image 620 of FIG. 8A may include a (2, 2) view image that has been restored as photographed at a front view (2, 2) of at least one object included in the layer image. The (2, 2) view image may be an image restored such that a user views the rendered layer image on the front surface through the stacked display device. In this example, since there is no depth difference due to the front view between the layer images included in the layer stack, the (2, 2) view image may be restored without shifting the layer images.

The LF image 620 may include a (0, 0) view LF image 620-1 that is restored at a view at which the at least one object included in the layer image is photographed at a view distant from −2 view interval in y-axis, and −2 view interval in x-axis from the front (2, 2) view. For example, the (0, 0) view LF image 620-1 may be the view LF image 620-1 restored such that a user views the layer image that is rendered through the stacked display device 200 in a view interval distant from the front view by −2 view interval, and a view by −2 view interval in an x axis.

Referring to FIG. 8A, while the LF image 620 is shown to include 25 images restored to be photographed at 25 views, the embodiment is not limited thereto and the second LF image may include (n*n) image such as 16, 36, 49, 64, etc., or may include (n*m) images.

FIG. 8B is a view illustrating a method in which an LF image 620 is restored by shifting three layer images according to a view corresponding to each LF image according to an embodiment of the disclosure.

Referring to FIG. 8B, it shows three layer images 710, 720, 730, and a layer image may include a back layer image (e.g., rear layer image 730), a middle layer image 710, and a front layer image 720. For example, the rear layer image 730 may be a third layer image for displaying an image on the third panel 130, and the middle layer image 710 may be a first layer image for displaying an image on the first panel 110. The front layer image 720 may be a second layer image for displaying an image on the second panel 120.

According to an embodiment, in order to train the factorization model 1000, the stacked display device 200 may apply shifting parameters for the rear layer image 730, the middle layer image 710, and the front layer image 720, respectively, with shifting parameters, to restore the rear layer image 730, the middle layer image 710, and the front layer image 720 to the LF image 620. The stacked display device 200 may train an AI model to perform factorization based on the restored LF image 620 and the LF image 600.

In one embodiment, the (2, 2) view LF image representing a front view is an image that is moved by +2 in Y axis and +2 view in x axis with respect to (0, 0) and is a reference of view, and all layer images may not be shifted. The reference point to which the shifting parameter is applied is a (2, 2) view LF image, which is the front view, and in the (2, 2) LF view image, the layer may not be shifted in accordance with the shifting parameter.

According to the disclosure, the middle layer image 710 may not be shifted to a layer that is a reference of shifting. Accordingly, a shifting parameter may not be applied to the middle layer image 710. The coefficient of the shifting parameter Sn applied to the rear layer image 730 and the front layer image 720 may be different according to a view.

According to an embodiment, the stacked display device 200 may shift the third subpixel layer image (e.g., rear layer image 730), which is a rear-layer image, by −2Sny subpixels in Y axis as much as (−2Sny, −2Snx) subpixel, with respect to the first subpixel layer image (e.g., middle layer image 710) which is the middle layer image, and may shift the second subpixel layer image (e.g., front layer image 720), which is a front layer image, by a (+2Sny, +2Snx) subpixel based on the first subpixel layer image (e.g., middle layer image 710). The stacked display device 200 may obtain a (0, 0) which is generated by cropping the shifted third subpixel layer image (e.g., rear layer image 730), the first subpixel layer image (e.g., middle layer image 710), and the shifted second subpixel layer image (e.g., front layer image 720) as (0,0) view LF image 620-1 representing (0,0) view. The stacked display device 200 may obtain a cropped image based on a region of the first subpixel layer image (e.g., middle layer image 710) as a (0,0) view LF image 620-1 after overlapping the shifted third subpixel layer image (e.g., rear layer image 730), the first subpixel layer image (e.g., middle layer image 710), and the shifted second subpixel layer image (e.g., front layer image 720). For example, the stacked display device 200 may set an average value of a pixel value of an overlapping area of three subpixel layer images as a pixel value of a corresponding area to obtain a (0,0) view LF image 620-1. The embodiment is not limited thereto, and the pixel values of the overlapping regions of the plurality of subpixel layer images may be set as a pixel value of the corresponding region, or a value obtained by adding all the pixel values of the overlapping region of the plurality of subpixel layer images to the pixel value of the corresponding region may be set to obtain the (0,0) view LF image 620-1.

The Snx according to the disclosure may be a shifting parameter for the X-axis direction, Sny may be a shifting parameter for the Y-axis direction, and in one embodiment, the value of Snx and Sny may be the same.

The stacked display device 200 may shift the third subpixel layer image (e.g., rear layer image 730) which is the rear layer image, with respect to the first subpixel layer image (e.g., middle layer image 710) which is the middle layer image, as much as (−Sny, −2Snx) subpixel, and may shift the second subpixel layer image (e.g., front layer image 720) which is the front layer image as much as (+Sny, +2Sny) subpixel with respect to the first subpixel layer image (e.g., middle layer image 710). The stacked display device 200 may obtain an image generated by cropping the shifted third subpixel layer image (e.g., rear layer image 730), the first subpixel layer image (e.g., middle layer image 710) and the shifted second subpixel layer image (e.g., front layer image 720) as (1,0) view LF image 620-2 representing the (1,0) view.

The stacked display device 200 may shift a third subpixel layer image (e.g., rear layer image 730), which is a rear-layer image, by a (0, −2Snx) subpixel based on a first subpixel layer image (e.g., middle layer image 710), which is a middle layer image, and may shift a second subpixel layer image (e.g., front layer image 720), which is a front-layer image, by a (0, 2Snx) subpixel based on the first subpixel layer image (e.g., middle layer image 710). The stacked display device 200 may obtain the image (2,0) generated by cropping the shifted third subpixel layer image (e.g., rear layer image 730), the first subpixel layer image (e.g., middle layer image 710), and the shifted second subpixel layer image (e.g., front layer image 720) as (2, 0) view LF images 620-3 representing (2, 0) view.

As for (0, 4) view LF Image (620-5), (0, 3) view LF image 620-4 and (3, 2) view LF image 620-6, the third subpixel layer image (e.g., rear layer image 730) which is the rear layer image and the second subpixel layer image (e.g., front layer image 720) which is the front layer image may be shifted and obtained s shown in FIG. 8B.

Referring to FIG. 8B, while the one-channel LF image is restored through the three one-channel layer images, the number of the layer images may be changed according to the performance of the stacked display device 200 or the number of panels of the stacked display device.

Figure 9:
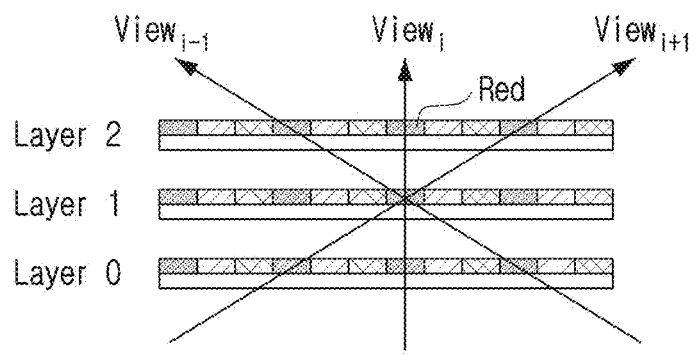
FIG. 9 is a diagram illustrating a red, green, blue (RGB) expression according to a value of a shifting parameter applied when the subpixel layer images are restored to an LF image, according to an embodiment of the disclosure.

FIG. 9 is a diagram illustrating an RGB expression according to a value of a shifting parameter applied when subpixel layer images are restored to an LF image, according to an embodiment of the disclosure. Specifically, FIG. 9 is a diagram illustrating an RGB expression when the value of the shifting parameter is a multiple of 3.

As described in FIG. 8B, the front layer image and the rear layer image of the three subpixel layer images may be shifted in subpixel units according to the value of the shifting parameter.

Referring to FIG. 9, a stacked display may include three panels, a subpixel layer image is a color image, and a front layer image and a rear layer image are shifted in subpixel units according to a value of a shifting parameter. Referring to FIG. 9, a rear layer image for displaying an image on a rear panel (layer 0), a middle layer image for displaying an image on the middle panel (layer 1), and a front layer image for displaying an image on the front panel (layer 2) may be displayed on each of the panels to be provided to the user.

Each layer image may be a subpixel color image according to the disclosure. In the subpixel color image, the RGB pattern may repeat at a multiple of 3. Therefore, when the front layer image and the rear layer image are shifted to multiples of 3, by each view, the red subpixels may be combined by red subpixels, the green subpixels are combined by green subpixels, and the blue subpixels are combined by blue subpixels so that the user may watch three layer images. Therefore, when the front layer image and the rear layer image are shifted by a multiple of 3, the RGB pattern is not mixed with each other, so that the RBG color may be expressed in all the three layer images.

Referring to FIG. 9, when the user views three layer images at each view of $view_i$, $view_{i-1}$, and $view_{i+1}$, only the red pixels are combined from each of the three layer images for all three views and viewed to a user and thus, the RGB color may not be mixed.

If the value of the shifting parameter is a multiple of 3, the factorization model 1000 may be set to output all three layer images as the color image.

Figure 10:
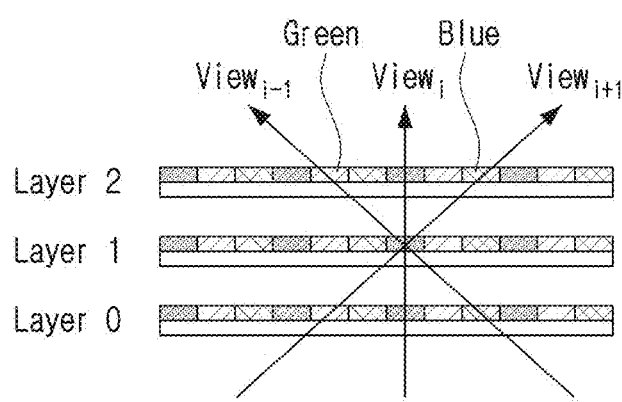
FIG. 10 is a diagram illustrating an RGB expression according to a value of a shifting parameter applied when subpixel layer images are restored to an LF image, according to an embodiment of the disclosure.

FIG. 10 is a diagram illustrating an RGB expression according to a value of a shifting parameter applied when subpixel layer images are restored to an LF image, according to an embodiment of the disclosure. Specifically, FIG. 10 is a diagram illustrating an RGB expression when the value of the shifting parameter is not a multiple of 3.

Referring to FIG. 10, a three subpixel layer image is a color image, a shifting parameter value is 2, and a front layer image and a rear layer image are shifted in subpixel units according to a value of a second shifting parameter. In this case, when the front layer image layer 2 and the rear layer image layer 0 are shifted according to the value of the shifting parameter that is not a multiple of 3, the red patterns may be mixed for each view.

Referring to 10, when the user looks at three layer images from $view_i$, only the red pixels may be combined from each of the three layer images to be shown to the user, but when the three layer images are viewed at each view of $view_{i-1}$ and $view_{i+1}$, respectively, the RGB pixels may be mixed and visible to the user.

If the value of the shifting parameter is not a multiple of 3, and if all three layer images are color images, the RED patterns may be mixed. Therefore, if the value of the shifting parameter is not a multiple of 3, the factorization model 1000 may output only the middle layer image as a color image, and may output the rear layer image and the front layer image as a black and white image. Accordingly, the color may be expressed in a middle layer image which is a reference (Ref) layer image, and the remaining layer images may be set to have only a contrast ratio adjustment.

Figure 11:
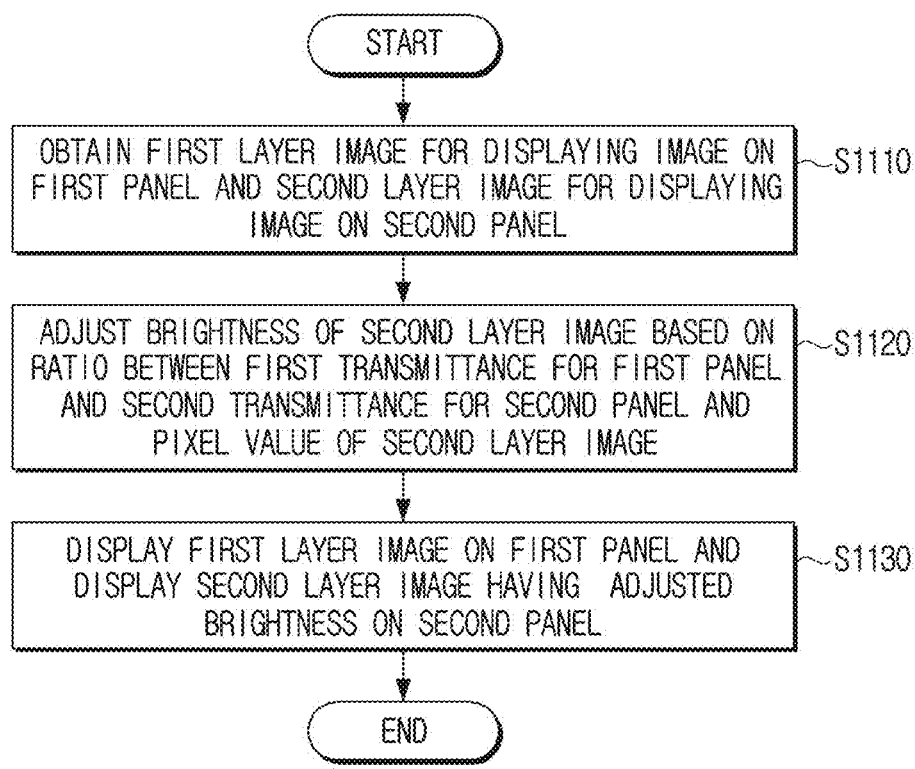
FIG. 11 is a flowchart illustrating a method of controlling a stacked display device according to an embodiment of the disclosure.

FIG. 11 is a flowchart illustrating a method of controlling a stacked display device according to an embodiment of the disclosure.

Referring to FIG. 11, a stacked display device 200 may obtain a first layer image for displaying an image on a first panel and a second layer image for displaying an image on a second panel in operation S1110.

For example, the stacked display device 200 may obtain the first layer image and the second layer image by inputting a plurality of light field (LF) images of different views to a factorization model for converting the LF image to a layer image. For example, the stacked display device 200 may obtain a restored LF image by inputting the first layer image and the second layer image to a simulation model, obtain a loss function by comparing the LF image and the restored LF image, and train the factorization model based on the loss function.

For example, the first panel may be a color panel including a color filter, and the second panel may be a monochrome not including a color filter. The transmittance of the second panel may be different from that of the first panel.

The stacked display device 200 may adjust the brightness of the second layer image based on the ratio between the first transmittance for the first panel and the second transmittance for the second panel and the pixel value of the second layer image in operation S1120.

For example, the pixel value of the second layer image may be an average value of a plurality of pixel values included in the second layer image.

For example, the stacked display device 200 may obtain a second layer image in which the brightness of each object of the second layer image is adjusted based on a representative pixel value of each object included in the second layer image. The stacked display device 200 may obtain representative pixel values for each object included in the layer image, and obtain exponent values corresponding to the representative pixel values for each object. The processor 230 may apply an exponent value corresponding to each object for each object in the layer image to obtain a second layer image of which brightness is adjusted.

When the first layer image and the second layer image are video images, the stacked display device 200 may obtain a second layer image in which the brightness of the second layer image is adjusted based on the average pixel value of the entire video frame. However, when the first layer image and the second layer image are video images, the stacked display device 200 may obtain a second layer image in which the brightness of each frame of the second layer image is adjusted based on the average pixel value for each video frame.

The stacked display device 200 may display the first layer image on the first panel and display the second layer image having the adjusted brightness on the second panel in operation S1130.

Although the above-described control method has been described as being provided with a first layer image and a second layer image through two panels, the disclosure is not limited thereto. That is, the stacked display device 200 may further include a third panel, and may obtain a third layer image for displaying an image on the third panel. The third panel may further include a multi-array lens.

The stacked display device 200 may obtain a third transmittance for the third panel, and obtain a third layer image in which the brightness of the third layer image is adjusted based on a ratio between the first transmittance and the third transmittance and a pixel value of the third layer image.

The stacked display device 200 may display the first layer image on the first panel, display the second layer image having the adjusted brightness on the second panel, and display the third layer image having the adjusted brightness on the third panel.

However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements throughout the disclosure.

In the disclosure, expressions such as "have," "may have," "include," "may include" or the like represent presence of a corresponding feature (for example, components such as numbers, functions, operations, or parts) and does not exclude the presence of additional feature.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, or (3) at least one A and at least one B together. As used herein, the terms "first," "second," or the like may denote various components, regardless of order and/or importance, and may be used to distinguish one component from another, and does not limit the components.

If a certain element (e.g., first element) is described as "operatively or communicatively coupled with/to" or "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Herein, the expression "configured to" may be used interchangeably with, for example, "suitable for," "having the capacity to," "designed to," "adapted to," "made to," or "capable of." The expression "configured to" does not necessarily mean "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processing unit (CPU) or application processor (AP)) that can perform the corresponding actions by executing one or more software programs stored in the memory device.

The term "unit" or "module" used in the disclosure includes units consisting of hardware, software, or firmware, and is used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

The various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

According to an embodiment of the disclosure, the method according to the various embodiments described herein may be provided while being included in a computer program product. The computer program product may be traded between a seller and a purchaser as a commodity. The computer program product may be distributed in the form of a machine-readable storage medium (e.g.: a compact disc read only memory (CD-ROM)), or distributed online through an application store (e.g.: PLAYSTORE™). In the case of online distribution, at least a portion of the computer program product may be at least temporarily stored in a storage medium such as a server of a manufacturer, a server of an application store, or a memory of a relay server, or temporarily generated.

Each of the elements (e.g., a module or a program) according to various embodiments may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by each respective element prior to integration. Operations performed by a module, a program, or another element, in accordance with various embodiments, may be performed sequentially, in a parallel, repetitively, or in a heuristically manner, or at least some operations may be performed in a different order, omitted or a different operation may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A stacked display device comprising:
a stacked display including a first panel, a second panel and a third panel comprising a different transmittance from the first panel respectively; and
a processor configured to:
obtain a first layer image to display an image on the first panel and a second layer image to display an image on the second panel and a third layer image to display an image on the third panel,
adjust brightness of the second layer image based on a ratio between a first transmittance for the first panel and a second transmittance for the second panel, and a pixel value of the second layer image,
obtain a third transmittance for the third panel,
obtain a third layer image of which brightness of the third layer image is adjusted based on the obtained third transmittance and a pixel value of the third layer image, and
control the stacked display to display the second layer image of which brightness is adjusted on the second panel and the third layer image of which the brightness is adjusted on the third panel while displaying the first layer image on the first panel.

2. The stacked display device of claim 1,
wherein the first panel is a color panel including a color filter, and
wherein the second panel is a monochrome panel not including a color filter.

3. The stacked display device of claim 1, wherein the third panel further comprises a multi-array lens.

4. The stacked display device of claim 1, wherein the pixel value of the second layer image comprises an average value of a plurality of pixel values included in the second layer image.

5. The stacked display device of claim 1, wherein the processor is further configured to:
obtain a second layer image of which brightness by objects of the second layer image is adjusted based on a representative pixel value of each of the objects included in the second layer image.

6. The stacked display device of claim 1, wherein the processor is further configured to:
based on the first layer image and the second layer image being a video, obtain a second layer image of which brightness of the second layer image is adjusted based on an average pixel value of video frames of an entire video.

7. The stacked display device of claim 1, wherein the processor is further configured to:
based on the first layer image and the second layer image being a video, obtain a second layer image of which brightness of the second layer image is adjusted based on an average pixel value of video frames of a portion of the video.

8. The stacked display device of claim 1, wherein the processor is further configured to:
obtain the first layer image and the second layer image by inputting a plurality of light field (LF) images of different views to a factorization model for converting the LF image to a layer image.

9. The stacked display device of claim 8, wherein the processor is further configured to:
obtain a restored LF image by inputting the first layer image and the second layer image to a simulation model;
obtain a loss function by comparing the LF image and the restored LF image; and
train the factorization model based on the loss function.

10. A control method of a stacked display device, the control method comprising:

obtaining a first layer image to display an image on a first panel of the stacked display device, a second layer image to display an image on a second panel of the stacked display device and a third layer image to display an image on a third panel of the stacked display device;

adjusting brightness of the second layer image based on a ratio between a first transmittance for the first panel and a second transmittance for the second panel, and a pixel value of the second layer image;

obtaining a third transmittance for the third panel;

obtaining a third layer image of which brightness of the third layer image is adjusted based on the third transmittance and the pixel value of the third layer image; and displaying the second layer image of which brightness is adjusted on the second panel and the third layer image of which the brightness is adjusted on the third panel while displaying the first layer image on the first panel, wherein a transmittance of the first panel is different from the transmittance of the second panel and the transmittance for the third panel.

11. The method of claim 10, wherein the first panel is a color panel including a color filter, and wherein the second panel is a monochrome panel not including a color filter.

12. The method of claim 10, wherein the third panel further comprises a multi-array lens.

13. The method of claim 10, wherein the pixel value of the second layer image comprises an average value of a plurality of pixel values included in the second layer image.

* * * * *